United States Patent [19]
Ferguson et al.

[11] 3,876,262
[45] Apr. 8, 1975

[54] EMERGENCY BRAKE APPARATUS FOR MULTIPLE UNIT OPERATION

[75] Inventors: James F. Ferguson; Robert J. Worbois, both of Irwin, Pa.

[73] Assignee: Westinghouse Air Brake Company, Wilmerding, Pa.

[22] Filed: Mar. 13, 1974

[21] Appl. No.: 450,872

[52] U.S. Cl. ................................. 303/76; 303/13
[51] Int. Cl. ............................................. B60t 15/16
[58] Field of Search .......... 303/8, 9, 13, 18, 19, 28, 303/76-79

[56] References Cited
UNITED STATES PATENTS
1,816,079   7/1931   Farmer ................................ 303/77
1,897,894   2/1933   Farrell et al. ........................ 303/76

*Primary Examiner*—Duane A. Reger
*Attorney, Agent, or Firm*—W. F. Poore; R. W. McIntire, Jr.

[57] ABSTRACT

This invention relates to locomotive brake control apparatus provided on each unit of a multi-unit locomotive and operable responsively, in multi-unit operation, while no unit is conditioned for lead unit or brake-controlling operation, to a certain chosen reduction of pressure in a train brake pipe, effected either from one of the units or from any location in the train, to a value that is less than that required to effect a full service brake application, to cause an unreleasable emergency brake application on all the units of the multi-unit locomotive until at least one of the several locomotive units is conditioned for lead unit or brake-controlling operation.

10 Claims, 1 Drawing Figure

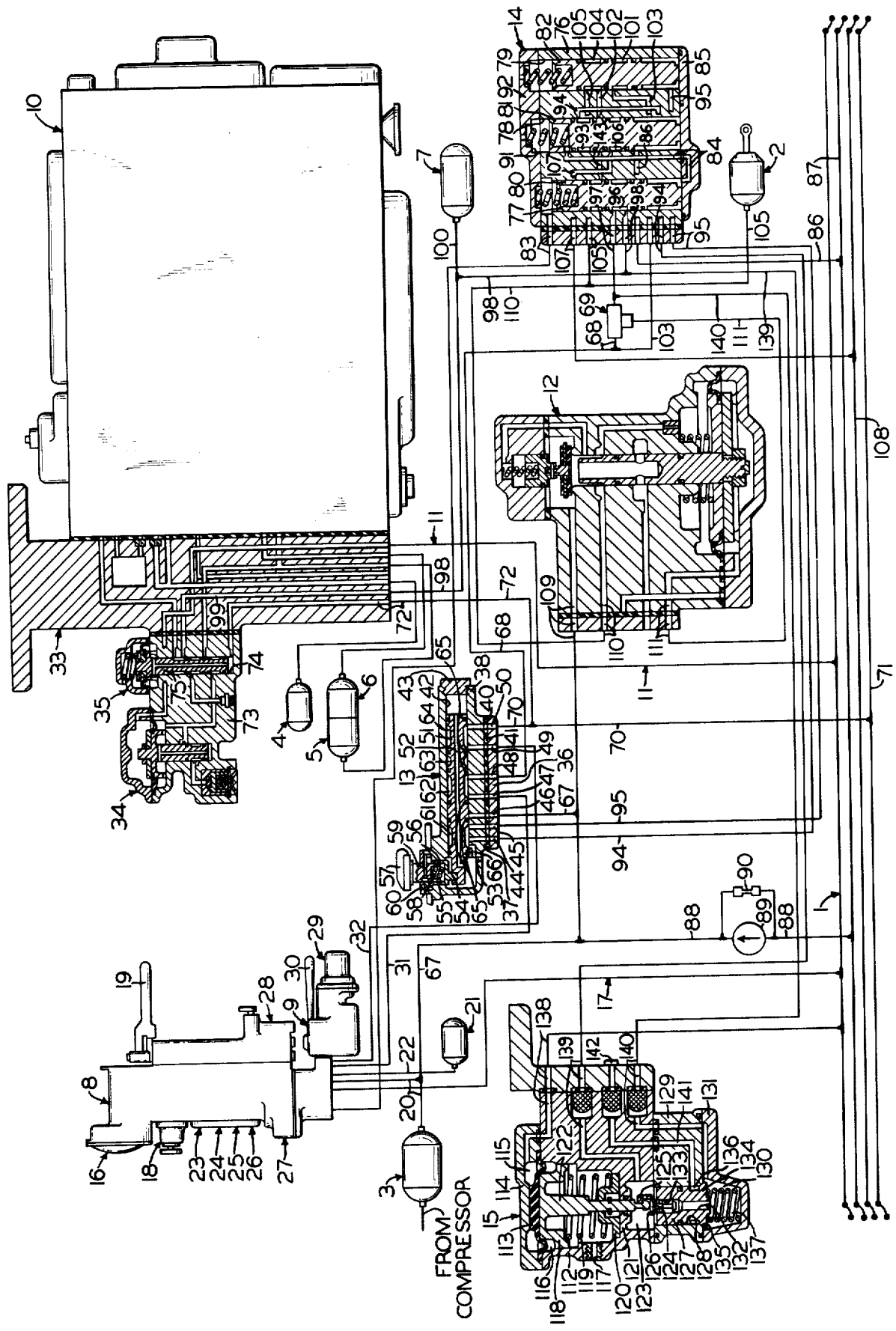

EMERGENCY BRAKE APPARATUS FOR MULTIPLE UNIT OPERATION

BACKGROUND OF THE INVENTION

In order to provide for manual control of the brakes on all the units of a multi-unit railway locomotive and the cars in a train hauled thereby from one of the units, usually the leading unit, the brake apparatus on each of the units includes manually operable means that, when properly adjusted, enables control of the brakes on the several units from the one unit so adjusted for control operation.

A locomotive engineer, may inadvertently, though against rules and regulations, fail to adjust the manually operable means on any one of the several units to enable control of the brakes on the several other units from any one unit of the multi-unit locomotive. Therefore, if a brake application is effected by operation of the brake control apparatus on any one of the units, no brake application will be obtained on any of the units of the multi-unit locomotive. Hence, it is apparent that the multi-unit locomotive is not provided with any braking force.

Accordingly, it is the general purpose of this invention to provide on each locomotive unit means that is operable responsively, in multi-unit operation, while not one of the manually operable means on the several units is adjusted to enable control from any one unit of the brakes on all of the units, to a certain chosen reduction of pressure in the brake pipe extending from end to end of the several units to a value that is less than that required to effect a full service brake application, to cause a brake application on all the locomotive units which application on all the units cannot be released until the engineer so adjusts the manually operable means on one of the locomotive units as to enable control of the brakes on all of the units from the unit having its manually operable means so adjusted.

SUMMARY OF THE INVENTION

According to the present invention, a locomotive brake control apparatus on each unit of a multi-unit railway locomotive has embodied therein a brake-pipe-pressure-responsive valve device operable, upon a chosen reduction of the pressure in a brake pipe extending from end to end of a multi-unit locomotive to a value that is less than that required to effect a full service brake application, to establish a communication through which fluid under pressure may flow from the brake cylinder port of a brake control valve device on the respective locomotive unit to a relay valve device on this unit whereupon this relay valve device is operated thereby to supply fluid under pressure to the brake cylinders thus causing a brake application on this unit notwithstanding that the manually controlled means on not one of the several units is positioned to provide for control of the brakes on all of the locomotive units from this unit. Moreover, a subsequent increase in brake pipe pressure to its normal charged value and operation of the brake-pipe-pressure-responsive valve device to close the communication through which fluid under pressure may flow from the brake cylinder port of the brake control valve device on the respective locomotive unit to the relay valve device on this unit prevents release of fluid under pressure from this relay valve device to cause a brake release on this unit until the manually operable means on one of the units of the multi-unit locomotive is adjusted to provide for control of the brakes on all of the locomotive units from the one unit.

In the accompanying drawing:

The single FIGURE is a diagrammatic view of a brake control apparatus embodying the invention.

Referring to the drawing, a railway fluid pressure brake control apparatus embodying the invention comprises on each unit of a multi-unit locomotive a brake pipe 1 that extends from end to end of the several locomotive units and back through each car in a train hauled thereby, a brake cylinder 2, a main reservoir 3, an auxiliary reservoir 4, a control reservoir 5, a selector volume reservoir 6, a volume reservoir 7, an engineer's automatic brake valve 8 for controlling the pressure in the brake pipe 1, an independent brake valve 9 for applying and releasing the fluid pressure brakes on the several locomotive units independently of those on the connected cars in a train, a brake control valve 10 connected to the brake pipe 1 by a branch pipe 11 and controlled by variations in pressure therein, a relay valve device 12, a manually operated change-over valve device 13 for controlling operation of a selector valve device 14 to condition the brake apparatus on the locomotive unit for operation either as a brake-controlling unit or as a non-brake-controlling unit, and a brake-pipe-pressure operated valve device 15 for connecting the brake cylinder port of the brake control valve 10 to the brake cylinder relay valve device 12 in bypassing relation to the selector valve device 14 in response to a certain chosen reduction of pressure in the brake pipe 1.

The engineer's automatic brake valve 8 and the independent brake valve 9 may be of the self-lapping type such as that disclosed in U.S. Pat. No. 2,958,561, issued Nov. 1, 1960 to Harry C. May, and assigned to the assignee of the present application.

The engineer's brake valve 8 comprises a relay valve 16 connected to the brake pipe 1 by a branch pipe 17 and operable in the manner described in the above-mentioned U.S. Pat. No. 2,958,561 to control variations of pressure therein, a self-lapping regulating or control valve 18 operable in response to manual arcuate movement of a handle 19 to control the supply of fluid under pressure from the main reservoir 3, which is connected to the engineer's brake valve 8 by a pipe 20, to an equalizing reservoir 21 connected to the brake valve 8 by a pipe 22, a brake pipe cut-off valve 23, a vent valve 24, an emergency valve 25, a suppression valve 26, an equalizing reservoir cut-off valve 27, and a manually positionable selector valve 28 for selectively conditioning the brake valve 8 for effecting either direct release operation of the brake control valve on each car in a train of cars hauled by a locomotive provided with the engineer's brake valve 8, if each car is provided with a direct release type brake control valve, or graduated application and graduated release operation of the brake control valve on each car if each car is provided with a graduated release type brake control valve, for cutting out control of brake pipe pressure by the brake valve 8 when the locomotive is not the lead or brake controlling unit in multiple unit operation, or for conducting a brake pipe leakage test. The valves 23, 24, 25, 26, 27 and 28 form no part of the present invention and will not be described in detail herein.

The independent brake valve 9 comprises a self-lapping valve unit 29 to which fluid under pressure is supplied from the main reservoir 3 via the pipe 20 and a passageway (not shown). This self-lapping unit 29 is operable in response to manual arcuate movement of a handle 30 to control the supply of fluid under pressure from the main reservoir 3 to a pipe 31 to cause an independent application of the brakes on only the several units of the multi-unit locomotive in a manner hereinafter explained.

As explained in detail in hereinbefore-mentioned U.S. Pat. No. 2,958,561, if it is desired to effect a complete release of the locomotive brakes while maintaining the brakes applied on the cars in the train, the handle 30 may be manually depressed for causing the pipe 31 to be maintained vented and a pipe 32 to be supplied with fluid under pressure from the main reservoir 3, this supply of fluid under pressure to the pipe 32 effecting an independent release of the brakes on all of the units of the multi-unit locomotive in a manner hereinafter described in detail.

The construction and operation of the brake control valve 10 may be the same as that of the brake control valve 3 shown and described in U.S. Pat. No. 2,937,906, issued May 24, 1960 to Harry C. May, and assigned to the assignee of the present invention.

As is the case in U.S. Pat. No. 2,937,906, the brake control valve 10 shown in the drawing is mounted on one side of a pipe bracket 33 on the opposite side of which is mounted an interlock valve device that comprises a quick release valve device 34 and a selector valve device 35. The construction and operation of the quick release valve device 34 and the selector valve device 35 may be the same as that of the quick release valve device 4 and the selector valve devide 5 shown in U.S. Pat. No. 2,937,906, it being noted, however, that these valve devices are shown in section in the drawing for the purpose of obtaining a better understanding of the present invention.

The construction and operation of the relay valve device 12 may be the same as that of the brake cylinder relay valve device 11 shown in FIG. 1B of the above-mentioned U.S. Pat. No. 2,958,561. Therefore, a further description of this relay valve device 12 is believed to be unnecessary.

The manually operated change-over valve device 13, which is located in the cab of the locomotive unit so that the engineer has easy access thereto, comprises a pipe bracket 36 that is provided on its upper side with a flat face 37 to which is secured by any suitable means (not shown) a body 38 having on its lower side a flat face 40 between which and the flat face 37 is disposed a gasket 41.

Extending from the lower side of the pipe bracket 36 through this pipe bracket, the gasket 41 and body 38 and opening at the wall surface of a bore 42 in the body 38, the right-hand end of which is closed by a plug 43, are seven passageways 44, 45, 46, 47, 48, 49, and 50, which passageways are connected by pipes, as hereinafter described in detail, to the various devices that comprise the brake apparatus on one unit of a multi-unit locomotive.

The manually operated change-over valve device 13 further comprises a spool-type selector valve 51 that is sealingly slidable in the bore 42 in the body 38 and exposed at both ends to atmospheric pressure via a longitudinal atmospheric passageway 52 in this selector valve 51 and a port 53 in the body 38 near the left-hand end of the bore 42. The selector valve 51 has adjacent its left-hand end a transversely extending notch into which extends a dog 54 that is eccentrically carried by a rotatable member 55 that is rotatably mounted in a bore 56 in the body 38. The selector valve 51 can be shifted axially in the bore 42 to either one of three positions, hereinafter defined, by rotation of the rotatable member 55 by means of a handle 57 which must be first pushed downward against the force of a bias spring 58 to disengage or unlock a pin 59 from a position-defining notch formed on the bottom side of a cover member 60 that closes the upper end of the bore 56 in the body 38. The bottom side of the cover member 60 is provided with a second position-defining notch into which the pin 59 is biased by the spring 58 upon release of the handle 57 subsequent to rotation thereof to effect shifting of the selector valve 51 from one of its positions to another.

Intermediate its ends the spool-type selector valve 51 has four axially spaced-apart elongated peripheral annular grooves 61, 62, 63 and 64. These elongated peripheral annular grooves are sealingly separated one from another by a plurality of O-rings 65 each carried in one of a plurality of spaced-apart peripheral annular grooves provided therefor in the spool-type selector valve 51. While the selector valve 51 occupies the position in which it is shown in the drawing, the peripheral annular groove 61 thereon connects the passageways 44 and 45, the peripheral annular groove 62 connects the passageways 47 and 48, and the peripheral annular groove 64 connects the passageways 49 and 50.

The body 38 is provided therein with a passageway 66 that at one end opens at the wall surface of the bore 42 in such a location that, while the selector valve 51 occupies the position shown in the drawing, enables the passageways 44 and 45 to be open to atmosphere via the groove 61, this passageway 66 and the port 53.

Connected to the passageway 46 is one end of a pipe 67 that at its opposite end is connected to the hereinbefore-mentioned pipe 20 intermediate the ends thereof, it being remembered that one end of this pipe 20 is connected to the main reservoir 3. Consequently, fluid at the pressure carried in the main reservoir 3 is constantly supplied to the passageway 46 via the pipes 20 and 67.

Connected to the passageway 47 is one end of the hereinbefore-mentioned pipe 31 and connected to the passageway 48 is one end of a pipe 68 the opposite end of which is connected to the left-hand inlet of a double check valve device 69.

Likewise, connected to the passageway 49 is one end of the hereinbefore-mentioned pipe 32, and connected to the passageway 50 is one end of a pipe 70 the opposite end of which is connected to an actuating pipe 71 that extends from end to end of the unit. When a unit having the brake apparatus shown in the drawing forms one unit of a multi-unit locomotive and is disposed between two other units, each of which is provided with an actuating pipe, one end of this actuating pipe 71 is connected by the usual hose and hose couplings to a like actuating pipe on one of the other two units and the other end of this pipe 71 is connected by a hose and hose coupling to the like actuating pipe on the other one of the other two units.

Connected to the pipe 70 intermediate the ends thereof is one end of a pipe 72 that at its opposite end is connected to a correspondingly numbered passageway that extends through the pipe bracket 33 and a casing 73 of the hereinbefore-mentioned quick release valve device 34 and selector valve device 35 and opens at the wall surface of a bore 74 in this casing below the end of a cylindrical release selector valve 75 of this selector valve device 35 to enable effecting an independent release of the brakes on this locomotive unit in the manner explained in detail in hereinbefore-mentioned U.S. Pat. No. 2,937,906.

The selector valve device 14 comprises a casing 76 having therein three parallel and spaced-apart bores 77, 78 and 79 in which are sealably and slidably mounted three spring-biased spool-type valves 80, 81 and 82. The top of the bore 80 is connected by a passageway and pipe 83 to the emergency valve 25 of the engineer's automatic brake valve 8 and, as explained in hereinbefore-mentioned U.S. Pat. No. 2,958,561, is open to atmosphere via this emergency valve 25 in all positions of the handle 19 except emergency position. The lower end of the bore 77 is connected by a passageway 84 that extends through a lower cover member 85 secured to the lower end of the casing 76 by any suitable means (not shown) and this casing 76 and opens at the wall surface of the bore 78 adjacent the upper end thereof. The lower end of the valve 81 is provided with a portion of reduced diameter, and opening at the wall surface of the bore 78 adjacent the upper end of this portion of reduced diameter is one end of a passageway 86 that is connected by a correspondingly numbered pipe to a main reservoir equalizing pipe 87 that extends from end to end of the locomotive unit. Like the actuating pipe 71, when the locomotive unit is disposed between two other units of a multi-unit locomotive, the respective opposite ends of this main reservoir equalizing pipe 87 are connected by the usual hose and hose couplings to like main reservoir equalizing pipes on the other two units, it being noted that this main reservoir equalizing pipe 87 is connected by a pipe 88 to the hereinbefore-mentioned pipe 67. A one-way flow check valve device 89 is so disposed in the pipe 88 as to open in the direction of the main reservoir 3 and a choke 90 is connected in bypassing relation to this check valve device so that fluid under pressure may flow at a rapid rate from the main reservoir equalizing pipe 87 to the main reservoir 3 via this check valve device 89 and at a restricted rate from this reservoir to the pipe 87 via the choke 90 to prevent excessive waste of fluid under pressure in the event the pipe 87 is ruptured.

Since the main reservoir equalizing pipe 87 is normally charged to the pressure present in the main reservoir 3, fluid under pressure will flow from the pipe 87 via the pipe and passageway 86 to the interior of the bore 78 below the portion of reduced diameter on the lower end of the valve 81 to move this valve 81 upward from the position in which it is shown in the drawing to a position in which the upper end thereof abuts a stop 91 formed on an upper cover 92 secured to the upper end of the casing 76 by any suitable means (not shown). In this upper position of the valve 81, an elongated peripheral annular groove 93 thereon adjacent the upper end thereof establishes a communication between the passageway 84 and a passageway and correspondingly numbered pipe 94 that is connected to the passageway 44 in the pipe bracket 36 of the manually operated change-over valve device 13 which passageway 44 is open to atmosphere while the selector valve 51 of this valve device 13 occupies its lead or brake-controlling position in which it is shown.

Opening at the wall surface of the bore 79 adjacent the lower end thereof is one end of a passageway 95 that extends through the casing 76 and is connected by a correspondingly numbered pipe to the passageway 45 in the pipe bracket 36 of the change-over valve device 13 which passageway 45 is also open to atmosphere, while the valve 51 is in its lead or brake-controlling position shown, via the groove 61, passageway 66, and port 53.

From the foregoing, it is apparent that the lower end of the bores 77 and 79 are both open to atmosphere so that the respective valves 80 and 82 slidably disposed in these bores are spring-biased to their lower position in which they are shown in the drawing to condition the brake apparatus for lead unit or brake-controlling operation.

While the spool-type valve 77 occupies the position shown, an elongated peripheral annular groove 96 thereon establishes a communication between a passageway 97 and a passageway 98. The passageway 97 is connected by a correspondingly numbered pipe to the right-hand inlet of the hereinbefore-mentioned double check valve device 69, and the passageway 98 is connected by a correspondingly numbered pipe to a passageway 99 in the pipe bracket 33 to which passageway 99 fluid under pressure is supplied when an automatic brake application is effected by operation of the control valve 10 in the manner explained in detail in hereinbefore-mentioned U.S. Pat. No. 2,937,906.

The volume reservoir 7 is connected by a pipe 100 to the pipe 98 intermediate the ends thereof, the purpose of this reservoir 7 being to provide proper regulation of the operation of the relay valve device 12.

While the spool-type valve 82 of the selector valve device 14 is spring-biased to its lower position in which it is shown, and elongated peripheral annular groove 101 formed thereon adjacent the lower end thereof closes communication between a passageway 102 in the casing 76, that at one end opens at the wall surface of the bore 78 below the location at which the passageway 94 opens at the wall surface of this bore 78 and at the opposite end opens at the wall surface of the bore 79, and a passageway 103 that opens at one end at the wall surface of the bore 79 at a location below that at which the above-mentioned opposite end of the passageway 102 opens at the wall surface of the bore 79. This passageway 103 extends through the casing 76 and is connected by a correspondingly numbered pipe to the pipe 68 intermediate the ends thereof.

While the valve 82 occupies the position in which it is shown, a second elongated peripheral annular groove 104 located on this valve 82 above the groove 101 thereon establishes a communication between that end of the passageway 102 that opens at the wall surface of the bore 79 and one end of a passageway 105 that opens at the wall surface of this bore 79 above the location at which the above-mentioned opposite end of the passageway 102 opens at the wall surface of this bore 79. This passageway 105 extends through the casing 76 and is connected by a correspondingly numbered pipe to the hereinbefore-mentioned brake cylinder 2.

While the valve 81 occupies the position shown in the drawing, an elongated peripheral annular groove 106 formed on this valve below the hereinbefore-mentioned groove 93 is ineffective to establish a communication between the above-mentioned one end of the passageway 102 and a passageway 107 that opens at one end at the wall surface of the bore 78 below the location at which this one end of the passageway 102 opens at this wall surface. This passageway 107 extends through the casing 76 and is connected by a correspondingly numbered pipe to a brake cylinder equalizing pipe 108 that extends from end to end of the locomotive unit. Like the actuating pipe 71 and the main reservoir equalizing pipe 87, when the locomotive unit is disposed between two other units of a multi-unit locomotive, the respective opposite ends of this brake cylinder equalizing pipe 108 are connected by the usual hose and hose couplings to like brake cylinder equalizing pipes on the other two units.

As shown in the drawing, a supply passageway 109 in the relay valve device 12 is connected by a correspondingly numbered pipe to the hereinbefore-mentioned pipe 67 intermediate the ends thereof in order that fluid under pressure may be supplied from the main reservoir 3 to the relay valve device 12. A delivery passageway 110 in the relay valve device 12 is connected by a correspondingly numbered pipe to the hereinbefore-mentioned pipe 105 intermediate the ends thereof, and a control passageway 111 in this device 12 is connected by a correspondingly numbered pipe to the outlet connection of the hereinbefore-mentioned double check valve device 69.

The fluid pressure operated valve device 15 comprises a casing section 112 containing a diaphragm 113 clamped about its outer periphery between the casing section 112, and a cover 114, and defining with this cover a control chamber 115. At the other side of the diaphragm 113 is a spring chamber 116 which is open to atmosphere through a passageway 117. Contained in the chamber 116 is a diaphragm follower 118 which is biased into operative contact with the diaphragm 113 by a spring 119 interposed between the diaphragm follower 118 and a hollow spring seat 120 that rests against a partition wall 121 of the chamber 116. Follower 118 has a stem 122 that extends through the hollow spring seat 120 and a central opening in the partition wall 121.

A chamber 123 is formed in the casing section 112 at the side of the partition wall 121 opposite the chamber 116 and contains a valve 124 that is linked by a means of a forked connection 125 to the lower end of the follower stem 122, as viewed in the drawing. The valve 124 is adapted to make seating contact with a valve seat 126 formed on the upper end of a cylindrical valve member 127 which is slidably mounted in a bore 128 formed in a casing section 129 which is secured to the casing section 112 by any suitable means (not shown). The bore 128 in the casing section 129 extends from the chamber 123 to a chamber 130 formed in another casing section 131 secured to the casing section 129 by any suitable means (not shown).

The valve member 127 is provided with a through bore 132 and a coaxial counterbore 133 encircled at its upper end by the valve seat 126. The lower end of the cylindrical valve member 127 is encircled by a conical or poppet-type valve 134, which is arranged for cooperation with a valve seat 135 formed on the casing section 129 at the lower end of the bore 128 to control communication between chamber 130 and a chamber 136 formed by the wall of the bore 128 and a reduced portion of the valve member 127. A spring 137 is disposed in chamber 130 and is interposed between the valve 134 and the casing section 131 for urging the valve member 127 upward to a position in which communication between chambers 123 and 130 is open via bore 132 and counterbore 133, and communication between chamber 130 and chamber 136 is closed as shown in the drawing.

In order that fluid under pressure may be supplied to the chamber 115 in the fluid pressure operated valve device 15 for effecting operation of this valve device, the chamber 115 is connected by a passageway and correspondingly numbered pipe 138 to the brake pipe 1 intermediate the ends thereof. In order for fluid pressure operated valve device 15 to be an effective bypass around the selector valve device 14, the chamber 123 is connected by a passageway and correspondingly numbered pipe 139 to the hereinbefore-mentioned pipe 98 intermediate the ends thereof, and the chamber 130 is connected by a passageway and correspondingly numbered pipe 140 to the hereinbefore-mentioned pipe 97 intermediate the ends thereof. A passageway 141 extending from the chamber 136 through the casing section 129 and 112 is closed by a blanking pad 142.

OPERATION

To initially charge the brake control apparatus shown in the drawing, the diesel engines are started for operating fluid compressors (not shown) to effect charging of the main reservoir 3.

It may be assumed that the handle 19 of the engineer's automatic brake valve 8 is in its release position. Therefore, while the handle 19 is in its release position, the self-lapping control valve 18 of this brake valve 8 is effective, as explained in the above-mentioned U.S. Pat. No. 2,958,561, to supply fluid under pressure from the main reservoir 3, which is connected to this control valve 18 via pipe 20, to the equalizing reservoir 21 and the operating chamber (not shown) in the relay valve 16. Consequently, the relay valve 16 will operate to effect the supply of fluid under pressure from its operating chamber (not shown), that is also connected to the main reservoir 3, to the train brake pipe 1 until this pipe 1 is fully charged to the pressure carried therein as determined by the setting of the control valve 18.

The brake control valves 10 on the several units of the multi-unit locomotive, provided the selector valve 51 of the change-over valve device 13 on one of the units occupies its lead or brake controlling position in which it is shown in the drawing, and the selector valve 51 of this valve device 13 on the other units occupies a first one of two trail or non-brake-controlling positions hereinafter described, and the control valves on the cars in the train will operate in response to the charging of the train brake pipe 1 to effect a release of the brakes on the entire train.

It will be noted from the drawing that fluid under pressure may flow from the main reservoir 3 to the supply passageway 109 in the relay valve device 12 via pipes 20, 67 and 109. Since the pipe 67 is connected to the passageway 46 in the change-over valve device 13, fluid under pressure will flow from the main reservoir 3 to this passageway 46.

Assume initially that the brake apparatus shown in the drawing is provided on the lead unit of a multi-unit locomotive and that the selector valve 51 of the change-over valve device 13 on this unit occupies its lead or brake controlling position in which it is shown. In this position the passageway 46 is closed, and the passageway and pipe 94 is open to atmosphere via passageway 44, groove 61, passageway 66 and port 53. Likewise, the passageway and pipe 95 is open to atmosphere via passageway 45, groove 61, passageway 66 and port 53.

Moreover, the groove 62 connects the passageways 47 and 48 and the groove 64 connects the passageways 49 and 50. Therefore, an independent application and a subsequent independent release of the brakes on the several units of the multi-unit locomotive may be effected in the usual manner by manual operation of the independent brake valve 9. Furthermore, an independent release of the brakes on the several units of the multi-unit locomotive may be effected, subsequent to effecting an automatic brake application on the entire train by operation of the engineer's automatic brake valve 8, by manually depressing the handle 30 of the independent brake valve 9 in the manner described in detail in hereinbefore-mentioned U.S. Pat. No. 2,958,561.

Let it now be assumed that the brake apparatus shown in the drawing is provided on each unit of a multi-unit locomotive. Let it be further assumed that, though against rules and regulations, the manually operated change-over valve device 13 on each one of the several units comprising the multi-unit locomotive occupies the first one of its two trail or non-brake-controlling positions, it being understood that for proper control of the brakes on the several units from one of these units, the selector valve 51 of the change-over valve device 13 on this one unit must occupy its lead or brake-controlling position, in which this valve 51 is shown in the drawing, while this selector valve 51 of the change-over valve device 13 on the remaining units occupies the first one of its two trail or non-brake-controlling positions which will now be described.

To condition the brake apparatus shown in the drawing for non-brake-controlling operation wherein the brakes on all the units of a multi-unit locomotive are controlled from one of the units that is provided with a brake apparatus identical to that shown in the drawing and occupying its lead or brake-controlling position as shown, the spool-type selector valve 51 of the manually operated change-over valve device 13 on this non-brake-controlling unit must be shifted axially from its lead or brake-controlling position in which it is shown in the drawing in the direction of the right hand to the first one of its two trail or non-brake-controlling positions.

To shift the selector valve 51 axially in the direction of the right hand from its lead or brake-controlling position in which it is shown to the first one of its two trail or non-brake-controlling positions, the engineer first pushes the handle 57 downward against the biasing force of the spring 58 to disengage or unlock the pin 59 from a position-defining notch in the cover member 60.

Next, the engineer will rotate the handle 57 so that the pin 59 through engagement with the rotatable member 55 effects rotation thereof whereupon the dog 54, eccentrically carried thereby and extending into the notch in the selector valve 51, effects shifting in the direction of the right hand of this selector valve 51 from its lead or brake-controlling position in which it is shown in the drawing to the first one of its two trail or non-brake-controlling positions in which the pin 59 can be spring-pressed into another position-defining notch in the cover member 60 upon the engineer releasing the handle 57.

Upon shifting the selector valve 51 from its lead or brake-controlling position to the first one of its two trail or non-brake-controlling positions, the passageway 46, which is connected to the main reservoir 3 in the manner hereinbefore explained, is connected via the groove 61 on this selector valve 51 to the passageways 44 and 45. Consequently, fluid under pressure will flow from the main reservoir 3 to the pipe 94 which is connected to the passageway 44 and to the pipe 95 which is connected to the passageway 45.

It will be noted from the drawing that fluid under pressure will flow from the main reservoir 3 to the lower end of the bore 78 in the selector valve device 14 via pipes 20, 67 and 88, choke 90, main reservoir equalizing pipe 87, and pipe and passageway 86, and shift the spring-biased valve 81 to its upper position in which its upper end abuts the stop 91 on the upper cover member 92. In this upper position, the groove 93 establishes a communication between passageways 94 and 84. Therefore, the fluid under pressure supplied to the pipe 94 in the manner explained above will flow via passageway 94, groove 93 and passageway 84 to shift the spring-biased valve 80 to its upper position in which the groove 96 cuts off communication between pipe and passageway 97 and pipe and passageway 98 thereby rendering the relay valve device 12 inoperative by the brake control valve 10.

The fluid under pressure supplied to the pipe 95 in the manner explained above will flow to the bottom of the bore 79 to shift the spring-biased valve 82 to its upper position in which the groove 104 cuts off communication between the passageways 102 and 105, and the groove 101 establishes a communication between the passageways 102 and 103.

It will be noted that the valves 80, 81 and 82 of the selector valve device 14 on each unit of the multi-unit locomotive that is conditioned for trailing or non-brake-controlling operation are now in their upper position. While the valve 80 of the selector valve device 14 on each unit of the multi-unit locomotive that is conditioned for trailing or non-brake-controlling operation occupies its upper position, the groove 96 closes communication between pipe and passageway 98 and passageway and pipe 97 which is connected to the relay valve device 12 via the double check valve device 69 and pipe and passageway 111. Therefore, no fluid under pressure can be supplied to the relay valve device 12 on each unit of the multi-unit locomotive that is conditioned for non-brake-controlling operation by operation of the control valve 10 on the corresponding unit in response to a brake pipe reduction at any rate to any degree. Consequently, the relay valve device 12 on each of these units is not operated to supply fluid under pressure to the brake cylinder 2 on the respective unit to cause a brake application on these units. Accordingly, no brake application is effected on each of these units of the multi-unit locomotive that is conditioned for trailing or non-brake-controlling operation by operation of the control valve 10 on the respective one of these trailing units so long as the pressure in the brake pipe 1 is not reduced sufficiently to cause operation of the fluid pressure operated valve device 15 on each of these units.

The strength of the spring 119 in the fluid pressure operated valve device 15 on each unit may be so selected that the pressure in the brake pipe 1 and the chamber 115 connected to this pipe 1 by the passageway and pipe 138 must be reduced to a certain chosen value, such as, for example, 35 pounds per square inch, before this spring 119 is effective to shift the diaphragm 113, diaphragm follower 118, stem 122 and valve 124 upward to the position shown thereby allowing the spring 137 to seat the valve 134 on its seat 135, it being noted that this reduction of pressure in the brake pipe 1 to a valve of 35 pounds per square inch is less than 50 pounds per square inch which is that required to effect a full service brake application.

If the pressure in the brake pipe 1 is now reduced to the above-mentioned certain chosen value of, for example, 35 pounds per square inch, as the result of the engineer moving the handle 19 of the engineer's automatic brake valve 8 on any one of the units of the multi-unit locomotive to its emergency position or otherwise effecting an overreduction so that the pressure in the brake pipe 1 is reduced to this value of 35 pounds per square inch or less, the springs 119 and 137 in the valve device 15 on each locomotive unit will effect respectively unseating of the corresponding valve 124 and seating of the valve 134.

Upon unseating of the valve 124 of the valve device 15 on each unit, the pipe 98 on that unit, which is connected to the brake cylinder port of the control valve 10 on this unit, is connected to the pipe 97 on this unit via pipe and passageway 139, chamber 123, counterbore 133, bore 132, chamber 130 and passageway and pipe 140.

The reduction of the pressure in the brake pipe 1 to the above-mentioned certain chosen value of, for example, 35 pounds per square inch, will cause the control valve 10 on each unit of the multi-unit locomotive to effect the supply of fluid under pressure from the auxiliary reservoir 4 on that unit to the corresponding pipe 97 via the valve device 15 now in the position shown in the drawing.

Fluid under pressure thus supplied to the pipe 97 on each unit flows to the right-hand end of the double check valve device 69 and thence through this device 69 and the pipe and passageway 111 to cause the corresponding relay valve device 12 to operate to supply fluid under pressure from the main reservoir 3 to the brake cylinder 2 on the respective locomotive unit. Thus a brake application is effected on each of the several units of the multi-unit locomotive.

The brake application thus effected on the several units will bring the multi-unit locomotive to a stop since this brake application cannot be released until the selector valve 51 of the manual change-over valve device 13 on one of the several units of the multi-unit locomotive is shifted from the first one of its two trail positions to its lead or brake controlling position. This is true for the following reasons:

When the selector valve 51 is shifted from its lead position to the first one of its two trail positions, the groove 62 thereon no longer establishes a communication from the pipe 31 to the pipe 68 via the ports 47 and 48 and this groove 62, and the groove 64 on this selector valve 51 no longer establishes a communication from the pipe 32 to the pipes 70, 71 and 72.

While the pipe 31 is thus cut off from the pipe 68, the independent brake valve 9 is rendered ineffective to supply and release fluid under pressure to and from the relay valve device 12 via the double check valve device 69 and pipe and passageway 111 to cause an independent brake application and a subsequent brake release on the several units of the multi-unit locomotive.

Moreover, while the pipe 32 is cut off from the pipes 70, 71 and 72, depressing the handle 30 of the independent brake valve 9, subsequent to effecting a brake application by means of manual operation of the engineer's brake valve 8, is ineffective to supply fluid under pressure to the pipes 70 and 72 and the actuating pipe 71 to cause an independent release of this brake application on the several units of the multi-unit locomotive.

Furthermore, if the handle 19 of the engineer's automatic brake valve 8 on the hereinbefore-mentioned one unit of the multi-unit locomotive is returned to its release position to cause the relay valve 16 of this brake valve 8 to operate to supply fluid under pressure from the main reservoir 3 on this unit to the brake pipe 1 to increase the pressure therein, this increase of pressure in the brake pipe 1 and therefore in the chamber 115 of the valve device 15 on each of the several units will increase to a value in excess of 35 pounds per square inch and thereby cause each valve device 15 to close communication between the corresponding pipes 140 and 139 before the pressure in the brake pipe 1 and the branch pipes 11 connected to the control valves 10 on the several units is increased sufficiently to cause operation of the service valve of the respective control valve 10 to return to its release position to connect the pipes 98 and 139 to atmosphere. Consequently, when the pressure in the brake pipe 1 is increased sufficiently to cause the service valve of the control valve 10 on each unit to return to its release position in which pipes 98 and 139 are connected to atmosphere, no fluid under pressure is released from the relay valve device 12 on each of the units since the valve device 15 on each unit now closes communication between the pipes 140 and 139 on the respective unit. Therefore, the brakes remain applied on the several units of the multi-unit locomotive notwithstanding charging of the brake pipe 1 to the normal pressure carried therein and return of the service valve of the control valve 10 on each unit to its release position in response to this charging of the brake pipe 1.

Accordingly, in order to now effect a release of the brakes on the several units of the multi-unit locomotive, it is necessary that the selector valve 51 of the change-over valve device 13 on one of the several units be returned to its lead position in which it is shown in the drawing by means of the handle 57.

When the selector valve 51 of the valve device 13 on one of the units is returned to the position shown in the drawing, the supply of fluid under pressure from the main reservoir 3 to the pipes 94 and 95 is cut off and these pipes and corresponding passageways in the selector valve 14 are connected to atmosphere in the manner hereinbefore described.

As fluid under pressure is thus released from the passageway 94, it is simultaneously released from the lower end of the bore 77 which is connected to the passageway 94 via the passageway 84 and the groove 93 on the valve 81 that is now being held in its upper position by fluid under pressure supplied from the main reservoir equalizing pipe 87 to the lower end of the bore 78 via the pipe and passageway 86. Consequently, as fluid under pressure is thus released from the lower end of the bore 77 to atmosphere via passageway 84, groove 93 on valve 81 now in its upper position, passageway and pipe 94, passageway 44, groove 61 on selector valve 51 of change-over valve 13 now in its lead position, passageway 66 and port 53, the spring-biased valve 80 of the selector valve device 14 on the one unit is returned to the position shown in the drawing in which the groove 96 on this valve 80 establishes a communication between the pipe and passageway 97 and the passageway and pipe 98.

Subsequent to return of the valve 80 of the selector valve device 14 on the one unit to the position shown in the drawing, and since it may be assumed that the service valve of the control valve 10 on this unit has returned to its release position in response to charging of the brake pipe 1, fluid under pressure will flow from the control chamber of the relay valve device 12 on this unit to atmosphere via passageway and pipe 111, double check valve 69, pipe and passageway 97, groove 96 on valve 80 now in the position shown in the drawing, passageway and pipe 98, passageway 99 in the pipe bracket 33 and the service valve of the control valve 10 now in its release position. As fluid under pressure is thus released from the relay valve device 12 on the one unit to atmosphere, this relay valve device 12 returns to its release position in which it is shown whereupon fluid under pressure will be released from the corresponding brake cylinder 2 to cause a brake release on the one unit.

Since the change-over valve device 13 on each of the several other units of the multi-unit locomotive unit, other than the above-mentioned one unit, is still in the first one of its two trail positions, fluid under pressure is supplied to the pipes and passageways 94 and 95 on these other units via pathways hereinbefore described. Furthermore, fluid under pressure is supplied from the main reservoir equalizing pipe 87 on these other units to the lower end of the bore 78 in the selector valve device 14 on each of these other units via the corresponding pipe and passageway 86. Consequently, the valves 80, 81 and 82 of each selector valve device 14 on these other units will be held in their upper position. Therefore, the groove 96 on the valve 80 establishes a communication between the pipe and passageway 97 and a passageway 143, and the groove 106 on the valve 81 establishes a communication between the passageway 143 and passageway and pipe 107, it being noted that this pipe 107 is connected to the brake cylinder equalizing pipe 108 that is connected to a like brake cylinder equalizing pipe on an adjacent unit. Thus, this brake cylinder equalizing pipe extends from end to end of the several units of the multi-unit locomotive.

The valve 81 in the selector valve 14 on the one unit, the change-over valve 13 on which has been returned to its lead position, is now in its upper position, and the valves 80 and 82 of this selector valve 14 are now in their lower position. With this valve 81 in its upper position, the groove 106 thereon establishes a communication between the passageway and pipe 107, which is connected to the brake cylinder equalizing pipe 108 that extends from end to end of the multi-unit locomotive, and the passageway 102. Since the valve 82 is now in its lower position, the groove 104 thereon establishes a communication between the passageway 102 and the passageway and pipe 105, it being noted that pipe 105 is connected to the pipe and passageway 110 that is open to atmosphere via the relay valve device 12 on the one unit while this device 12 occupies its release position.

From the foregoing, it can be seen that the control chamber of the relay valve device 12 on each of the several other units of the multi-unit locomotive is open to atmosphere via the corresponding passageway and pipe 111, double check valve 69, pipe and passageway 97, groove 96 on valve 80 now in its upper position, passageway 143, groove 106 on valve 81 now in its upper position, passageway and pipe 107 that is connected to the brake cylinder equalizing pipe 108 that extends from end to end of the multi-unit locomotive, the pipe and passageway 107 on the above-mentioned one unit, groove 106 on the valve 81 of the selector valve 14 on this one unit, passageway 102 in this selector valve 14, groove 104 on valve 82, passageway and pipe 105, pipe and passageway 110 and the relay valve 12 on the one unit, it being understood that this relay valve device 12 on the one unit has returned to its release position in which it is shown in the drawing. Consequently, the relay valve device 12 on each of the several other units of the multi-unit locomotive will operate in response to the release of fluid under pressure from its control chamber to atmosphere to release fluid under pressure from the corresponding brake cylinder 2 to atmosphere thereby causing a release of the brakes on the respective unit. Thus, as the relay valve device 12 on the one unit operates to cause a release of the brakes on this one unit, the relay valve device 12 on each one of the other units will operate to cause a release of the brakes on the corresponding unit of the multi-unit locomotive.

Subsequent to the return of the valve 51 of the changeover valve device 13 on the one locomotive unit to its lead position in which it is shown in the drawing, an independent brake application and a subsequent independent brake release may be obtained on each of the several units of the multi-unit locomotive by manual operation of the independent brake valve 9 on the one unit.

Manual arcuate movement of the handle 30 of the independent brake valve 9 on this one unit out of its release position and into an application zone will cause the self-lapping unit 29 of this brake valve 9 to operate in the manner described in hereinbefore-mentioned U.S. Pat. No. 2,958,561 to effect the supply of fluid under pressure from the main reservoir 3 on this one unit to the corresponding pipe 31.

Fluid under pressure thus supplied to the pipe 31 will flow therefrom to the control chamber of the relay valve device 12 on this one unit via passageway 47, groove 62, passageway 48, pipe 68, double check valve 69, and pipe and passageway 111 whereupon this relay valve device 12 will operate to effect the supply of fluid under pressure to the corresponding brake cylinder 2 via passageway and pipe 110 and pipe 105 to cause a brake application on this one unit.

Some of the fluid under pressure supplied to the pipe 105 will flow to the brake cylinder equalizing pipe 108 on this one unit via passageway 105, groove 104 on the valve 82 of the selector valve device 14 on this one unit, this valve 82 now being in its lower position in which it is shown, passageway 102, the groove 106 on the valve 81, which is now held in its upper position by fluid under pressure supplied to the lower end of the bore 78 from the main reservoir equalizing pipe 87 via pipe and passageway 86, and passageway and pipe 107.

The brake cylinder equalizing pipe 108 extends from end to end of the multi-unit locomotive. Therefore, fluid under pressure flows to the pipe and passageway 107 on each of the several other units. It being remembered that the change-over valve device 13 on each of these several other units occupies the first one of its two trail positions, and that the valves 80, 81 and 82 of the selector valve device 14 on each of these several other units occupy their upper position, fluid under pressure will flow from pipe and passageway 107 on each of these units via the groove 106 on the valve 81, the passageway 102, the groove 101 on the valve 82 of the selector valve 14 on each of these units, the corresponding passageway and pipe 103 which is connected to the left-hand end of the double check valve 69, this check valve 69 and the pipe and passageway 111 to the control chamber of the relay valve 12 on the corresponding unit. Accordingly, it is apparent that the relay valve device 12 on each one of these several other units will now be operated to effect the supply of fluid under pressure to the corresponding brake cylinder 2 to cause a brake application on the respective unit.

Return of the handle 30 of the independent brake valve 9 on the one unit will cause operation of the self-lapping unit 9 of this brake valve 9 to release fluid under pressure from the control chamber of the relay valve device 12 on the one unit of the multi-unit locomotive. This relay valve device 12 will now operate to release fluid under pressure from the brake cylinder 2 on this one unit and also from the control chamber of the relay valve device 12 on the several other units of the multi-unit locomotive to cause a brake release on all of the units.

If it is desired to effect an independent release of the brakes on all of the units of the multi-unit locomotive without effecting a release of the brakes on the cars in a train hauled thereby, subsequent to effecting a service brake application on the entire train by means of the automatic brake valve 8 on the one unit or some other means such as, for example, an emergency valve (not shown) on any locomotive unit or car in the train if provided therewith and connected to the brake pipe 1, the engineer will manually depress the handle 30 of the independent brake valve 9 on the one locomotive unit.

When the handle 30 is depressed, the independent brake valve 9 will operate in the manner described in detail in the hereinbefore-mentioned U.S. Pat. No. 2,958,561 to effect the supply of fluid under pressure from the main reservoir 3 to the pipe 32.

Fluid under pressure thus supplied to the pipe 32 flows therefrom to the pipe 70 via the passageway 49, groove 64 on the selector valve 51 of the change-over valve 13 on the one unit, and the passageway 50.

Some of the fluid under pressure thus supplied to the pipe 70 flows therefrom to the bottom of the bore 74 of the selector valve device 35 via the pipe and passageway 72 whereupon this selector valve device 35 will operate in the manner described in hereinbefore-mentioned U.S. Pat. No. 2,937,906 to cause a brake release on the one unit.

Furthermore, some of the fluid under pressure that is supplied to the pipe 70 flows to the actuating pipe 71 which extends from end to end of the multi-unit locomotive. Therefore, fluid under pressure supplied to the actuating pipe 71 on each of the several other units will flow from this pipe 71 on the respective unit to the bottom of the bore 74 of the selector valve 35 on this unit. Accordingly, the selector valve 35 on each unit will operate in response to the fluid under pressure supplied thereto to cause a brake release on that unit. Thus, it is seen that an independent release of the brakes on all of the units of the multi-unit locomotive is effected substantially simultaneously in response to the engineer manually depressing the handle 30 of the independent brake valve 9 on the one unit.

When one or more units of a multi-unit locomotive is provided with the brake apparatus shown in the drawing and another of the units is provided with a brake apparatus as shown and described in U.S. Pat. No. 2,889,175 issued June 2, 1959 to Harry C. May and assigned to the assignee of the present application, and the brakes are to be controlled from the unit provided with the brake apparatus shown in this patent, it is necessary that the selector valve 51 of the manually operable change-over valve 13 on the one or more units be shifted from its lead position in which it is shown in the drawing to the second one of its two trail positions.

Accordingly, to shift the selector valve 51 of this change-over valve 13 from its lead position to the second one of its two trail positions, the engineer first pushes the handle 57 downward to disengage the pin 59 from the position-defining notch in the cover member 60.

Next, he will rotate this handle 57 in the direction to effect shifting of the selector valve 51 in the direction of the right hand to the second one of its two trail positions in which the pin 59 can be spring-pressed into a third position-defining notch in the cover member 60 upon release of the handle 57.

While the selector valve 51 occupies the second one of its two trail position, the passageway 46, which is connected to the main reservoir 3 in the manner previously described, is connected to only the passageway 45 since the left-hand O-ring 65 carried by the selector valve 51 will now form a seal with the wall surface of the bore 42 at a location between the locations at which the passageways 44 and 45 open at the wall surface of this bore 42. Therefore, the pipe and passageway 94 will be open to atmosphere via passageway 44, left-hand end of bore 42, passageway 66 and port 53, and fluid under pressure supplied from the main reservoir 3 to the passageway 45 will flow to the lower end of the bore 79 in casing 66 of the selector valve device 14 on each of the one or more units to shift the corresponding valve 82 to its upper position.

Moreover, fluid under pressure will flow from the main reservoir equalizing pipe 87 to the lower end of the bore 78 in the casing 66 to shift the valve 81 to its upper position.

However, it will be noted that the lower end of the bore 77 is now open to atmosphere via the passageway 84, groove 93 on valve 81, and passageway and pipe 94 which is connected to atmosphere in the manner just described. Therefore, the valve 80 will be spring-biased to its lower position in which it is shown in the drawing.

While the valve 80 of the selector valve device 14 on each of the one or more units occupies its lower position, the groove 96 thereon establishes a communication between passageway and pipe 97 and passageway and pipe 98. Therefore, operation of the relay valve device 12 on each of the one or more units remains under the control of the control valve 10 on this unit. It being remembered that the brakes on all of the units of the multi-unit locomotive are now controlled from that one of the units that is provided with brake apparatus as shown in the above-mentioned U.S. Pat. No. 2,889,175, it will be understood that a reduction of pressure in the brake pipe 1 to any degree will cause the control valve 10 on any one of the several other units that is provided with the brake apparatus shown in the drawing to operate to supply fluid under pressure to the relay valve device 12 which in turn operates to supply fluid under pressure to the brake cylinder 2 to effect a brake application on the respective one of the one or more units in bypass and irrespective of the operation of the fluid pressure operated valve device 15 on the one or more units.

It may be noted, however, that if the pressure in the brake pipe 1 is reduced to the hereinbefore-mentioned value of 35 pounds per square inch to cause operation of the valve device 15 on each one of the one or more units of the multi-unit locomotive, this operation of the respective valve device 15 merely establishes a communication that is in parallel with the communication established by the groove 96 on the valve 80 of the selector valve device 14 on the corresponding unit. Therefore, this operation of the valve device 15 on each one of the one or more units provided with the brake apparatus shown in the drawing in no way effects proper control of the brakes on all of the units of the multi-unit locomotive from that one of the units that is provided with brake apparatus as shown in the above-mentioned U.S. Pat. No 2,889,175.

Having now described the invention what we claim as new and desire to secure by Letters Patent, is:

1. In a multi-unit locomotive brake control apparatus comprising on each locomotive unit the combination of:
   a. a brake pipe extending from end to end of the respective locomotive unit and connected to a corresponding brake pipe on an adjacent locomotive unit,
   b. a brake valve operable to control the pressure in said brake pipe,
   c. a brake cylinder device,
   d. a fluid pressure operated self-lapping type relay valve device for controlling the supply and release of fluid under pressure to and from said brake cylinder device, said relay valve device having a release position, an application position and a lap position,
   e. a control valve device operable in response to variations of pressure in said brake pipe to control the supply of fluid under pressure to and the release of fluid under pressure from said relay valve device,
   f. a selector valve device interposed between said control valve device and said relay valve device, said selector valve device having a first two-position valve means that in a first position establishes a communication through which said control valve device may supply fluid under pressure to said relay valve device to cause operation thereof, and a second position in which said communication is closed,
   g. a manually operable means selectively operable at one time when the respective locomotive unit is a brake controlling unit, to a first position in which fluid under pressure is vented from said selector valve device to enable movement of said first two-position valve to its first position, and operable at another time when the respective locomotive is a non-brake-controlling unit, to a second position to effect the supply of fluid under pressure to cause movement of said first two-position valve means to its second position, and wherein the improvement comprises:
   h. a fluid pressure operated valve device operable responsively to a certain chosen reduction of the pressure in said brake pipe to establish a communication in bypassing relation to said communication closed by said first two-position valve means while in said second position, thereby enabling the control valve device on each locomotive unit to effect the supply of fluid under pressure to the corresponding relay valve device to cause a brake application on the respective unit notwithstanding that said manually operable means on each unit of the multi-unit locomotive occupies its said second position.

2. A multi-unit locomotive brake control apparatus, as recited in claim 1, further characterized in that said certain chosed reduction of pressure in said brake pipe is less than that required to cause said control valve device to supply fluid under pressure to said relay valve device to the degree required to effect a full service brake application on each respective unit of the multi-unit locomotive.

3. A multi-unit locomotive brake control apparatus, as recited in claim 1, further characterized in that said certain chosen reduction of pressure in said brake pipe is substantially less than that required to cause said control valve device to supply fluid under pressure to said relay valve device to the degree required to effect a full service brake application on each respective unit of the multi-unit locomotive thereby insuring operation of said fluid pressure operated valve device to close said bypassing communication in response to an increasing pressure in said brake pipe prior to the pressure in said brake pipe increasing to that value required to cause operation of said control valve device to release fluid under pressure from said relay valve device to cause a brake release on the respective locomotive unit thereby precluding a brake release on all the units of the multi-unit locomotive until said manually operable means on one of the units is returned to its said one position to vent fluid under pressure from said selector valve device thereby enabling return of said first two-position valve means of said selector valve device to its said first position in which said communication is established through which operation of the control valve device on said one unit in response to the pressure in said brake pipe increasing to said required value may release fluid under pressure from the corresponding relay valve device to cause a brake release on all the units of the multi-unit locomotive.

4. A multi-unit locomotive brake control apparatus, as recited in claim 1, further characterized in that said selector valve device comprises:
   a. a second two-position valve means that in a first position establishes a communication through which said manually operable means, while in its said second position, supplies fluid under pressure to cause operation of said first two-position valve means of said selector valve device from its first position to its said second position, and in a second position closes said communication, and b. conduit means in said selector valve device through which fluid under pressure may be supplied for effecting movement of said second two-position valve means from its said second position to its said first position.

5. A multi-unit locomotive brake control apparatus, as recited in claim 4, further characterized in that said selector valve device comprises:
   a. a third two-position valve means that in a first position establishes a communication through which fluid under pressure may be supplied to and released from said brake cylinder device and in a second position closes said communication, and
   b. conduit means in said selector valve through which fluid under pressure may be supplied upon manual movement of said manually operable means to its said second position to cause movement of said third two-position valve means from its said second position to its said first position whereby fluid under pressure is released from the brake cylinder device on a non-brake-controlling unit to atmosphere via said first two-position valve means and said second two-position valve means of the selector valve device on the respective non-brake-controlling unit while these valves occupy respectively their second and first positions, said second two-position valve means and said third two-position valve means of the selector valve on the brake controlling unit while these valve means occupy respectively their second and first positions, and the relay valve device on said brake controlling unit while said relay valve device occupies its said release position in which fluid under pressure is also released from the brake cylinder device on said brake-controlling unit to atmosphere via said relay valve device.

6. A multi-unit locomotive brake apparatus, as recited in claim 4, further characterized in that said brake valve comprises a manually operable engineer's automatic brake valve device having an operating handle arcuately movable from a release position into an application zone and a self-lapping valve mechanism for effecting reductions of pressure in said brake pipe to a degree corresponding to the degree of arcuate movement of said handle out of its release position and into said application zone to cause a brake application on all of the units of the multi-unit locomotive to a degree in accordance with the position to which said handle is moved only while said manually operable means on one of the units occupies its said first position.

7. A multi-unit locomotive brake apparatus, as recited in claim 4, further characterized in that said brake valve further comprises a manually operable engineer's automatic brake valve device having an operating handle arcuately movable from a release position into an application zone and a self-lapping valve mechanism for effecting reductions of pressure in said brake pipe to a degree corresponding to the degree of arcuate movement of said handle out of its release position and into said application zone to cause a brake application on all of the units of the multi-unit locomotive to a degree in accordance with the position to which said handle is moved only while said manually operable means on one of the units occupies its said first position, and said fluid pressure operated valve device is operable responsively to said certain chosen reduction of pressure effected in said brake pipe by operation of the self-lapping valve mechanism of said engineer's automatic brake valve device while said manually operable means on all of the units occupies its said second position to cause a brake application on all the units of the multi-unit locomotive.

8. A multi-unit locomotive brake control apparatus, as recited in claim 6, further characterized in that said brake valve further comprises a manually operable independent brake valve device for effecting an independent application and a subsequent independent release of the brakes on all the units of the multi-unit locomotive and also an independent release of the brakes on all the units subsequent to manual operation of said automatic brake valve device to effect a brake application on all of the units only so long as the manually operable means on one of said units occupies its said first position.

9. A multi-unit locomotive brake apparatus, as recited in claim 4, further characterized in that said brake valve further comprises a manually operable engineer's automatic brake valve device having an operating handle arcuately movable from a release position into an application zone and a self-lapping valve mechanism for effecting reductions of pressure in said brake pipe to a degree corresponding to the degree of arcuate movement of said handle out of its release position and into said application zone to cause a brake application on all of the units of the multi-unit locomotive to a degree in accordance with the position to which said handle is moved only while said manually operable means on one of the units occupies its said first position, and said fluid pressure operated valve device is operable responsively to said certain chosen reduction of pressure effected in said brake pipe in any manner while said manually operable means on all of the units occupies its said second position to cause a brake application on all the units of the multi-unit locomotive.

10. A multi-unit locomotive brake control apparatus, as recited in claim 8, further characterized in that said control valve device comprises a fluid pressure operated selector valve device, and each unit has an application pipe connected to said fluid pressure operated selector valve device and to said manually operable means on the respective unit and to a like application pipe on an adjacent unit whereby only so long as the manually operable means on one of the units of the multi-unit locomotive occupies its said first position, can an independent brake release be effected on all of the units by the supply of fluid under pressure to said application pipe in response to manual operation of the independent brake valve device on the one unit subsequent to operation of said engineer's automatic brake valve device on the one unit to effect a brake application on all the units of the multi-unit locomotive.

* * * * *